US009510165B2

(12) United States Patent
Patel et al.

(10) Patent No.: US 9,510,165 B2
(45) Date of Patent: Nov. 29, 2016

(54) PUSH-TO-TALK-OVER-CELLULAR (POC) SERVICE IN HETEROGENEOUS NETWORKS (HETNETS) AND MULTIMODE SMALL CELL ENVIRONMENTS

(71) Applicant: Kodiak Networks, Inc., San Ramon, CA (US)

(72) Inventors: Krishnakant M. Patel, Richardson, TX (US); Brahmananda R. Vempati, Dallas, TX (US); Ravi Ayyasamy, Richardson, TX (US); Harisha M. Negalaguli, Richardson, TX (US); Ramu Kandula, Bangalore (IN); Bibhudatta Biswal, Richardson, TX (US)

(73) Assignee: KODIAK NETWORKS, INC., Plano, TX (US)

( * ) Notice: Subject to any disclaimer, the term of this patent is extended or adjusted under 35 U.S.C. 154(b) by 0 days.

(21) Appl. No.: 14/639,794

(22) Filed: Mar. 5, 2015

(65) Prior Publication Data
US 2015/0256984 A1 Sep. 10, 2015

Related U.S. Application Data

(60) Provisional application No. 61/948,429, filed on Mar. 5, 2014.

(51) Int. Cl.
*H04W 4/10* (2009.01)
*H04W 84/08* (2009.01)
*H04W 76/00* (2009.01)
*H04W 88/06* (2009.01)

(52) U.S. Cl.
CPC ............ *H04W 4/10* (2013.01); *H04W 76/005* (2013.01); *H04W 84/08* (2013.01); *H04W 88/06* (2013.01)

(58) Field of Classification Search
CPC ... H04W 4/10; H04W 88/06; H04W 76/005; H04W 84/08
USPC ................................ 455/416, 419, 518, 519
See application file for complete search history.

(56) References Cited

U.S. PATENT DOCUMENTS

2008/0181145 A1\* 7/2008 Chowdhury ............ H04W 4/08
370/310

\* cited by examiner

*Primary Examiner* — Sam Bhattacharya
(74) *Attorney, Agent, or Firm* — Slater Matsil, LLP

(57) ABSTRACT

A system and method for supporting multiple simultaneous connections to different access networks for use in Push-to-talk-over-Cellular (PoC). One or more servers interface to a plurality of wireless communications networks to perform advanced voice services for mobile units therein, including the PoC call session. The servers and mobile units communicate with each other using control messages, and the servers switch voice frames between the mobile units. At least one of the servers manages the PoC call session by acting as an arbitrator, and controls the sending of the control messages and the voice frames to and from the mobile units. At least one of the mobile units and at least one of the servers use multiple simultaneous connections to the plurality of wireless communications networks to communicate with each other.

30 Claims, 6 Drawing Sheets

PUSH-TO-TALK-OVER-CELLULAR (POC) SERVICE IN HETEROGENEOUS NETWORKS (HETNETS) AND MULTIMODE SMALL CELL ENVIRONMENTS

CROSS REFERENCE TO RELATED APPLICATIONS

This application claims the benefit under 35 U.S.C. Section 119(e) of the following commonly-assigned patent application:

U.S. Provisional Application Ser. No. 61/948,429, filed Mar. 5, 2014, by Krishnakant M. Patel, Brahmananda R. Vempati, and Ravi Ayyasamy, entitled "PUSH-TO-TALK-OVER-CELLULAR (PoC) SERVICE IN HETEROGENEOUS NETWORKS (HETNETS) AND MULTIMODE SMALL CELL ENVIRONMENTS"; and which application is incorporated by reference herein.

This application is related to the following commonly-assigned patent applications:

U.S. Utility application Ser. No. 10/515,556, filed Nov. 23, 2004, by Gorachand Kundu, Ravi Ayyasamy and Krishnakant Patel, entitled "DISPATCH SERVICE ARCHITECTURE FRAMEWORK," now U.S. Pat. No. 7,787,896, issued Aug. 31, 2010, which application claims the benefit under 35 U.S.C. Section 365 of P.C.T. International Application Serial Number PCT/US03/16386, which application claims the benefit under 35 U.S.C. Section 119(e) of U.S. Provisional Application Ser. Nos. 60/382,981, 60/383,179 and 60/407,168;

U.S. Utility application Ser. No. 10/564,903, filed Jan. 17, 2006, by F. Craig Farrill, Bruce D. Lawler and Krishnakant M. Patel, entitled "PREMIUM VOICE SERVICES FOR WIRELESS COMMUNICATIONS SYSTEMS," which application claims the benefit under 35 U.S.C. Section 365 of P.C.T. International Application Serial Number PCT/US04/23038, which application claims the benefit under 35 U.S.C. Section 119(e) of U.S. Provisional Application Ser. Nos. 60/488,638, 60/492,650 and 60/576,094 and which application is a continuation-in-part and claims the benefit under 35 U.S.C. Sections 119, 120 and/or 365 of P.C.T. International Application Serial Number PCT/US03/16386;

U.S. Utility application Ser. No. 11/126,587, filed May 11, 2005, by Ravi Ayyasamy and Krishnakant M. Patel, entitled "ARCHITECTURE, CLIENT SPECIFICATION AND APPLICATION PROGRAMMING INTERFACE (API) FOR SUPPORTING ADVANCED VOICE SERVICES (AVS) INCLUDING PUSH TO TALK ON WIRELESS HANDSETS AND NETWORKS," now U.S. Pat. No. 7,738,892, issued Jun. 15, 2010, which application claims the benefit under 35 U.S.C. Section 119(e) of U.S. Provisional Application Ser. Nos. 60/569,953 and 60/579,309, and which application is a continuation-in-part and claims the benefit under 35 U.S.C. Sections 119, 120 and/or 365 of U.S. Utility application Ser. No. 10/515,556 and P.C.T. International Application Serial Number PCT/US04/23038;

U.S. Utility application Ser. No. 11/129,268, filed May 13, 2005, by Krishnakant M. Patel, Gorachand Kundu, Ravi Ayyasamy and Basem Ardah, entitled "ROAMING GATEWAY FOR SUPPORT OF ADVANCED VOICE SERVICES WHILE ROAMING IN WIRELESS COMMUNICATIONS SYSTEMS," now U.S. Pat. No. 7,403,775, issued Jul. 22, 2008, which application claims the benefit under 35 U.S.C. Section 119(e) of U.S. Provisional Application Ser. No. 60/571,075, and which application is a continuation-in-part and claims the benefit under 35 U.S.C. Sections 119, 120 and/or 365 of U.S. Utility application Ser. No. 10/515,556 and P.C.T. International Application Serial Number PCT/US04/23038;

U.S. Utility application Ser. No. 11/134,883, filed May 23, 2005, by Krishnakant Patel, Vyankatesh V. Shanbhag, Ravi Ayyasamy, Stephen R. Horton and Shan-Jen Chiou, entitled "ADVANCED VOICE SERVICES ARCHITECTURE FRAMEWORK," now U.S. Pat. No. 7,764,950, issued Jul. 27, 2010, which application claims the benefit under 35 U.S.C. Section 119(e) of U.S. Provisional Application Ser. Nos. 60/573,059 and 60/576,092, and which application is a continuation-in-part and claims the benefit under 35 U.S.C. Sections 119, 120 and/or 365 of U.S. Utility application Ser. No. 10/515,556, P.C.T. International Application Serial Number PCT/US04/23038, U.S. Utility application Ser. No. 11/126,587, and U.S. Utility application Ser. No. 11/129,268;

U.S. Utility application Ser. No. 11/136,233, filed May 24, 2005, by Krishnakant M. Patel, Vyankatesh Vasant Shanbhag, and Anand Narayanan, entitled "SUBSCRIBER IDENTITY MODULE (SIM) ENABLING ADVANCED VOICE SERVICES (AVS) INCLUDING PUSH-TO-TALK, PUSH-TO-CONFERENCE AND PUSH-TO-MESSAGE ON WIRELESS HANDSETS AND NETWORKS," now U.S. Pat. No. 7,738,896, issued Jun. 15, 2010, which application claims the benefit under 35 U.S.C. Section 119(e) of U.S. Provisional Application Ser. No. 60/573,780, and which application is a continuation-in-part and claims the benefit under 35 U.S.C. Sections 119, 120 and/or 365 of U.S. Utility application Ser. No. 10/515,556, P.C.T. International Application Serial Number PCT/US04/23038, U.S. Utility application Ser. No. 11/126,587, and U.S. Utility application Ser. No. 11/134,883;

U.S. Utility application Ser. No. 11/158,527, filed Jun. 22, 2005, by F. Craig Farrill, entitled "PRESS-TO-CONNECT FOR WIRELESS COMMUNICATIONS SYSTEMS," now U.S. Pat. No. 7,529,557, issued May 5, 2009, which application claims the benefit under 35 U.S.C. Section 119(e) of U.S. Provisional Application Ser. No. 60/581,954, and which application is a continuation-in-part and claims the benefit under 35 U.S.C. Sections 119, 120 and/or 365 of U.S. Utility application Ser. No. 10/515,556 and P.C.T. International Application Serial Number PCT/US04/23038);

U.S. Utility application Ser. No. 11/183,516, filed Jul. 18, 2005, by Deepankar Biswaas, entitled "VIRTUAL PUSH TO TALK (PTT) AND PUSH TO SHARE (PTS) FOR WIRELESS COMMUNICATIONS SYSTEMS," which application claims the benefit under 35 U.S.C. Section 119(e) of U.S. Provisional Application Ser. No. 60/588,464;

U.S. Utility application Ser. No. 11/356,775, filed Feb. 17, 2006, by Krishnakant M. Patel, Bruce D. Lawler, Giridhar K. Boray, and Brahmananda R. Vempati, entitled "ENHANCED FEATURES IN AN ADVANCED VOICE SERVICES (AVS) FRAMEWORK FOR WIRELESS COMMUNICATIONS SYSTEMS," now U.S. Pat. No. 7,813,722, issued Oct. 12, 2010, which application claims the benefit under 35 U.S.C. Section 119(e) of U.S. Provisional Application Ser. No. 60/654,271;

P.C.T. International Application Serial Number PCT/US2006/011628, filed Mar. 30, 2006, by Krishnakant M. Patel, Gorachand Kundu, Sameer Dharangaonkar, Giridhar K. Boray, and Deepankar Biswas, entitled "TECHNIQUE FOR IMPLEMENTING ADVANCED VOICE SERVICES USING AN UNSTRUCTURED SUPPLEMENTARY SERVICE DATA (USSD) INTERFACE," which application claims the benefit under 35 U.S.C. Section 119(e) of U.S. Provisional Application Ser. No. 60/666,424;

U.S. Utility application Ser. No. 11/462,332, filed Aug. 3, 2006, by Deepankar Biswas, Krishnakant M. Patel, Giridhar K. Boray, and Gorachand Kundu, entitled "ARCHITECTURE AND IMPLEMENTATION OF CLOSED USER GROUP AND LIMITING MOBILITY IN WIRELESS NETWORKS," now U.S. Pat. No. 7,689,238, issued Mar. 30, 2010, which application claims the benefit under 35 U.S.C. Section 119(e) of U.S. Provisional Application Ser. No. 60/705,115;

U.S. Utility application Ser. No. 11/463,186, filed Aug. 8, 2006, by Ravi Ayyasamy and Krishnakant M. Patel, entitled "ADVANCED VOICE SERVICES CLIENT FOR BREW PLATFORM," now U.S. Pat. No. 8,036,692, issued Oct. 11, 2011, which application claims the benefit under 35 U.S.C. Section 119(e) of U.S. Provisional Application Ser. No. 60/706,265;

U.S. Utility application Ser. No. 11/567,098, filed Dec. 5, 2006, by Ravi Ayyasamy, Bruce D. Lawler, Krishnakant M. Patel, Vyankatesh V. Shanbhag, Brahmananda R. Vempati, and Ravi Shankar Kumar, entitled "INSTANT MESSAGING INTERWORKING IN AN ADVANCED VOICE SERVICES (AVS) FRAMEWORK FOR WIRELESS COMMUNICATIONS SYSTEMS," which application claims the benefit under 35 U.S.C. Section 119(e) of U.S. Provisional Application Ser. No. 60/742,250;

U.S. Utility application Ser. No. 11/740,805, filed Apr. 26, 2007, by Krishnakant M. Patel, Giridhar K. Boray, Ravi Ayyasamy, and Gorachand Kundu, entitled "ADVANCED FEATURES ON A REAL-TIME EXCHANGE SYSTEM," now U.S. Pat. No. 7,853,279, issued Dec. 14, 2010, which application claims the benefit under 35 U.S.C. Section 119(e) of U.S. Provisional Application Ser. No. 60/795,090;

U.S. Utility application Ser. No. 11/891,127, filed Aug. 9, 2007, by Krishnakant M. Patel, Deepankar Biswas, Sameer P. Dharangaonkar and Terakanambi Nanjanayaka Raja, entitled "EMERGENCY GROUP CALLING ACROSS MULTIPLE WIRELESS NETWORKS," which application claims the benefit under 35 U.S.C. Section 119(e) of U.S. Provisional Application Ser. No. 60/836,521;

U.S. Utility application Ser. No. 12/259,102, filed on Oct. 27, 2008, by Krishnakant M. Patel, Gorachand Kundu, and Ravi Ayyasamy, entitled "CONNECTED PORTFOLIO SERVICES FOR A WIRELESS COMMUNICATIONS NETWORK," which application claims the benefit under 35 U.S.C. Section 119(e) of U.S. Provisional Application Ser. Nos. 60/982,650 and 61/023,042;

U.S. Utility application Ser. No. 12/359,861, filed on Jan. 26, 2009, by Bruce D. Lawler, Krishnakant M. Patel, Ravi Ayyasamy, Harisha Mahabaleshwara Negalaguli, Binu Kaiparambil, Shiva Cheedella, Brahmananda R. Vempati, Ravi Shankar Kumar, and Avrind Shanbhag, entitled "CONVERGED MOBILE-WEB COMMUNICATIONS SOLUTION," now U.S. Pat. No. 8,676,189, issued Mar. 18, 2014, which application claims the benefit under 35 U.S.C. Section 119(e) of U.S. Provisional Application Ser. No. 61/023,332;

U.S. Utility application Ser. No. 12/582,601, filed Oct. 20, 2009, by Krishnakant M. Patel, Ravi Ayyasamy, Gorachand Kundu, Basem A. Ardah, Anand Narayanan, Brahmananda R. Vempati, and Pratap Chandana, entitled "HYBRID PUSH-TO-TALK FOR MOBILE PHONE NETWORKS," which application claims the benefit under 35 U.S.C. Section 119(e) of U.S. Provisional Application Ser. No. 61/106,689;

U.S. Utility application Ser. No. 12/781,566, filed on May 17, 2010, by Bruce D. Lawler, Krishnakant M. Patel, Ravi Ayyasamy, Harisha Mahabaleshwara Negalaguli, Binu Kaiparambil, Shiva K. K. Cheedella, Brahmananda R. Vempati, and Ravi Shankar Kumar, entitled "CONVERGED MOBILE-WEB COMMUNICATIONS SOLUTION," now U.S. Pat. No. 8,670,760, issued Mar. 11, 2014, which application is a continuation-in-part and claims the benefit under 35 U.S.C. Sections 119, 120 and/or 365 of U.S. Utility application Ser. No. 12/582,601;

U.S. Utility application Ser. No. 12/750,175, filed on Mar. 30, 2010, by Bruce D. Lawler, Krishnakant M. Patel, Ravi Ayyasamy, Harisha Mahabaleshwara Negalaguli, Basem A. Ardah, Gorachund Kundu, Ramu Kandula, Brahmananda R. Vempati, Ravi Shankar Kumar, Chetal M. Patel, and Shiva K. K. Cheedella, entitled "ENHANCED GROUP CALLING FEATURES FOR CONNECTED PORTFOLIO SERVICES IN A WIRELESS COMMUNICATIONS NETWORK," now U.S. Pat. No. 8,498,660, issued Jul. 30, 2013, which application claims the benefit under 35 U.S.C. Section 119(e) of U.S. Provisional Application Ser. Nos. 61/164,754 and 61/172,129;

U.S. Utility application Ser. No. 12/961,419, filed Dec. 6, 2010, by Ravi Ayyasamy, Bruce D. Lawler, Brahmananda R. Vempati, Gorachand Kundu and Krishnakant M. Patel, entitled "COMMUNITY GROUP CLIENT AND COMMUNITY AUTO DISCOVERY SOLUTIONS IN A WIRELESS COMMUNICATIONS NETWORK," which application claims the benefit under 35 U.S.C. Section 119(e) of U.S. Provisional Application Ser. No. 61/266,896;

U.S. Utility application Ser. No. 13/039,635, filed on Mar. 3, 2011, by Narasimha Raju Nagubhai, Ravi Shankar Kumar, Krishnakant M. Patel, and Ravi Ayyasamy, entitled "PREPAID BILLING SOLUTIONS FOR PUSH-TO-TALK IN A WIRELESS COMMUNICATIONS NETWORK," now U.S. Pat. No. 8,369,829, issued Feb. 5, 2013, which application claims the benefit under 35 U.S.C. Section 119(e) of U.S. Provisional Application Ser. No. 61/310,245;

U.S. Utility application Ser. No. 13/093,542, filed Apr. 25, 2011, by Brahmananda R. Vempati, Krishnakant M. Patel, Pratap Chandana, Anand Narayanan, Ravi Ayyasamy, Bruce D. Lawler, Basem A. Ardah, Ramu Kandula, Gorachand Kundu, Ravi Shankar Kumar, and Bibhudatta Biswal, and entitled "PREDICTIVE WAKEUP FOR PUSH-TO-TALK-OVER-CELLULAR (PoC) CALL SETUP OPTIMIZATIONS," now U.S. Pat. No. 8,478,261, issued Jul. 2, 2013, which application claims the benefit under 35 U.S.C. Section 119(e) of U.S. Provisional Application Ser. No. 61/347,217;

U.S. Utility application Ser. No. 13/710,683, filed Dec. 11, 2012, by Ravi Ayyasamy, Gorachand Kundu, Krishnakant M. Patel, Brahmananda R. Vempati, Harisha M. Negalaguli, Shiva K. K. Cheedella, Basem A. Ardah, Ravi Shankar Kumar, Ramu Kandula, Arun Velayudhan, Shibu Narendranathan, Bharatram Setti, Anand Narayanan, and Pratap Chandana, entitled "PUSH-TO-TALK-OVER-CELLULAR (PoC)," which application claims the benefit under 35 U.S.C. Section 119(e) of U.S. Provisional Application Ser. No. 61/570,694;

U.S. Utility application Ser. No. 13/917,561, filed Jun. 13, 2013, by Krishnakant M. Patel, Brahmananda R. Vempati, Anand Narayanan, Gregory J. Morton, and Ravi Ayyasamy, entitled "RUGGEDIZED CASE OR SLEEVE FOR PROVIDING PUSH-TO-TALK (PTT) FUNCTIONS," which application claims the benefit under 35 U.S.C. Section 119(e) of U.S. Provisional Application Ser. No. 61/659,292; U.S. Provisional Application Ser. No. 61/682,524; and U.S. Provisional Application Ser. No. 61/705,748;

U.S. Utility application Ser. No. 13/757,520, filed Feb. 1, 2013, by Krishnakant M. Patel, Harisha Mahabaleshwara Negalaguli, Brahmananda R. Vempati, Shiva Koteshwara Kiran Cheedella, Arun Velayudhan, Raajeev Kuppa, Gorachand Kundu, Ravi Ganesh Ramamoorthy, Ramu Kandula, Ravi Ayyasamy, and Ravi Shankar Kumar, entitled "WiFi INTERWORKING SOLUTIONS FOR PUSH-TO-TALK-OVER-CELLULAR (PoC)," which application claims the benefit under 35 U.S.C. Section 119(e) of U.S. Provisional Application Ser. No. 61/593,485;

U.S. Utility application Ser. No. 14/093,240, filed Nov. 29, 2013, by Gorachand Kundu, Krishnakant M. Patel, Harisha Mahabaleshwara Negalaguli, Ramu Kandula, and Ravi Ayyasamy, entitled "METHOD AND FRAMEWORK TO DETECT SERVICE USERS IN INSUFFICIENT WIRELESS RADIO COVERAGE NETWORK AND IMPROVE SERVICE DELIVERY EXPERIENCE BY GUARANTEED PRESENCE," which application claims the benefit under 35 U.S.C. Section 119(e) of U.S. Provisional Application Ser. No. 61/730,856;

P.C.T. International Application Serial Number PCT/US2014/036414, filed May 1, 2014, by Krishnakant M. Patel, Harisha Mahabaleshwara Negalaguli, Arun Velayudhan, Ramu Kandula, Syed Nazir Khadar, Shiva Koteshwara Kiran Cheedella, and Subramanyam Narasimha Prashanth, entitled "VOICE-OVER-IP (VOIP) DENIAL OF SERVICE (DOS) PROTECTION MECHANISMS FROM ATTACK," which application claims the benefit under 35 U.S.C. Section 119(e) of U.S. Provisional Application Ser. No. 61/818,109; and U.S. Provisional Application Ser. No. 61/821,975;

U.S. Utility application Ser. No. 14/286,427, filed May 23, 2014, by Krishnakant M. Patel, Ravi Ayyasamy and Brahmananda R. Vempati, entitled "METHOD TO ACHIEVE A FULLY ACKNOWLEDGED MODE COMMUNICATION IN PUSH-TO-TALK OVER CELLULAR (PoC)," which application claims the benefit under 35 U.S.C. Section 119(e) of U.S. Provisional Application Ser. No. 61/826,895;

P.C.T. International Application Serial Number PCT/US2014/047863, filed on Jul. 23, 2014, by Gorachand Kundu, Giridhar K. Boray, Brahmananda R. Vempati, Krishnakant M. Patel, Ravi Ayyasamy, and Harisha M. Negalaguli, entitled "EFFECTIVE PRESENCE FOR PUSH-TO-TALK-OVER-CELLULAR (PoC) NETWORKS," which application claims the benefit under 35 U.S.C. Section 119(e) of U.S. Provisional Application Ser. No. 61/857,363; and U.S. Provisional Application Ser. No. 61/944,168;

P.C.T. International Application Serial Number PCT/US15/10617, filed Jan. 8, 2015, by Krishnakant M. Patel, Brahmananda R. Vempati, and Harisha Mahabaleshwara Negalaguli, entitled "OPTIMIZED METHODS FOR LARGE GROUP CALLING USING UNICAST AND MULTICAST TRANSPORT BEARER FOR PUSH-TO-TALK-OVER-CELLULAR (PoC)," which application claims the benefit under 35 U.S.C. Section 119(e) of U.S. Provisional Application Ser. No. 61/924,897; and P.C.T. International Application Serial Number PCT/US2014/047886, filed on Jul. 23, 2014, by Gorachand Kundu, Giridhar K. Boray, Brahmananda R. Vempati, Krishnakant M. Patel, Ravi Ayyasamy, Harisha Mahabaleshwara Negalaguli, and Ramu Kandula, entitled "RADIO ACCESS NETWORK (RAN) AWARE SERVICE DELIVERY FOR PUSH-TO-TALK-OVER-CELLULAR (PoC) NETWORKS," which application is a continuation-in-part under 35 U.S.C. Section 120 of P.C.T. International Application Serial Number PCT/US2014/047863;

all of which applications are incorporated by reference herein.

BACKGROUND OF THE INVENTION

1. Field of the Invention

This invention relates in general to advanced voice services in wireless communications networks, and more specifically, to a system and method for supporting multiple simultaneous connections to different access networks for use in Push-to-talk-over-Cellular (PoC).

2. Description of Related Art

Advanced voice services (AVS), also known as Advanced Group Services (AGS), such as two-way half-duplex voice calls within a group, also known as Push-to-talk-over-Cellular (PoC), Push-to-Talk (PTT), or Press-to-Talk (P2T), as well as other AVS functions, such as Push-to-Conference (P2C) or Instant Conferencing (IC), Push-to-Message (P2M), etc., are described in the co-pending and commonly-assigned patent applications cross-referenced above and incorporated by reference herein. These AVS functions have enormous revenue earnings potential for wireless communications systems, such as cellular networks, wireless data networks and IP networks.

One approach to PoC is based on packet or voice-over-IP (VoIP) technologies. This approach capitalizes on the "bursty" nature of PoC conversations and makes network resources available only during talk bursts and hence is highly efficient from the point of view of network and spectral resources. This approach promises compliance with newer and emerging packet-based standards, such as GPRS (General Packet Radio Service), UMTS (Universal Mobile Telecommunications System), 3G/4G/LTE ($3^{rd}$ Generation/$4^{th}$ Generation/Long Term Evolution), etc.

Nonetheless, there is a need in the art for improvements to the methods and systems for delivering the advanced voice services, such as PoC, that comply with both existing and emerging wireless packet-based standards and yet provide superior user experiences. For example, many existing implementations of PoC do not support multiple simultaneous connections to different access networks. The present invention, on the other hand, satisfies the need for supporting multiple simultaneous connections to different access networks, and also defines procedures for practical implementation of PoC in commercial, standards-based, cellular networks.

SUMMARY OF THE INVENTION

To overcome the limitations in the prior art described above, and to overcome other limitations that will become apparent upon reading and understanding the present specification, the present invention discloses a system and method for supporting multiple simultaneous connections to different access networks for use in Push-to-talk-over-Cellular (PoC).

Specifically, the present invention discloses a system and method for providing advanced voice services in a plurality of wireless communications networks. The system includes one or more servers that interface to the plurality of wireless communications networks to perform advanced voice services for one or more mobile units therein, wherein the advanced voice services include an instant two-way half-duplex voice call within a group of the mobile units comprising a Push-to-Talk-over-Cellular (PoC) call session.

Both the servers and the mobile units that use the advanced group services communicate with each other using control messages transmitted via the plurality of wireless communications networks, and at least one of the servers switches voice frames for the advanced group services between the mobile units across the plurality of wireless communications networks. At least one of the servers manages the PoC call session by acting as an arbitrator for the PoC call session and controls the sending of the control messages and the voice frames to and from the mobile units. At least one of the mobile units and at least one of the servers use multiple simultaneous connections to the plurality of wireless communications networks to communicate with each other.

In this system, the control messages and voice frames are transported simultaneously across each of the plurality of wireless communications networks. Moreover, the control messages and voice frames are duplicated before being transported simultaneously across each of the plurality of wireless communications networks. In addition, the mobile units may transition between the multiple simultaneous connections to the plurality of wireless communications networks.

In this system, one or more of the plurality of wireless communications networks are selected as a primary network and one or more of the plurality of wireless communications networks are selected as a secondary network. Selection of the primary network and the secondary network is performed dynamically by at least one of the mobile units or servers based on information reported by or to the mobile units or servers. Specifically, the selection of the primary network and the secondary network is performed dynamically based on decision factors, including network latency, packet loss, signal strength or transport cost. In this regard, the selection of the primary network and the secondary network is performed by applying thresholds to the decision factors, normalizing values observed for the decision factors, and applying weightings to the decision factors. Thereafter, the PoC call session may include a pre-established PoC call session over the primary network and an on-demand PoC call session established simultaneously over the secondary network.

In addition, error correction level may be determined heuristically by at least one of the mobile units or servers based on reports for a specified location made during previous PoC call sessions.

Finally, an adaptive jitter buffer may be used to homogenize the voice frames transmitted on each of the plurality of wireless communications networks. The adaptive jitter buffer removes duplicate voice frames received through the plurality of wireless communications networks. In addition, the adaptive jitter buffer reorders the voice frames received through the plurality of wireless communications networks. The adaptive jitter buffer also handles packets containing variable numbers of voice frames on each of the plurality of wireless communications networks.

BRIEF DESCRIPTION OF THE DRAWINGS

Referring now to the drawings in which like reference numbers represent corresponding parts throughout.

DETAILED DESCRIPTION OF THE INVENTION

Figure 1:
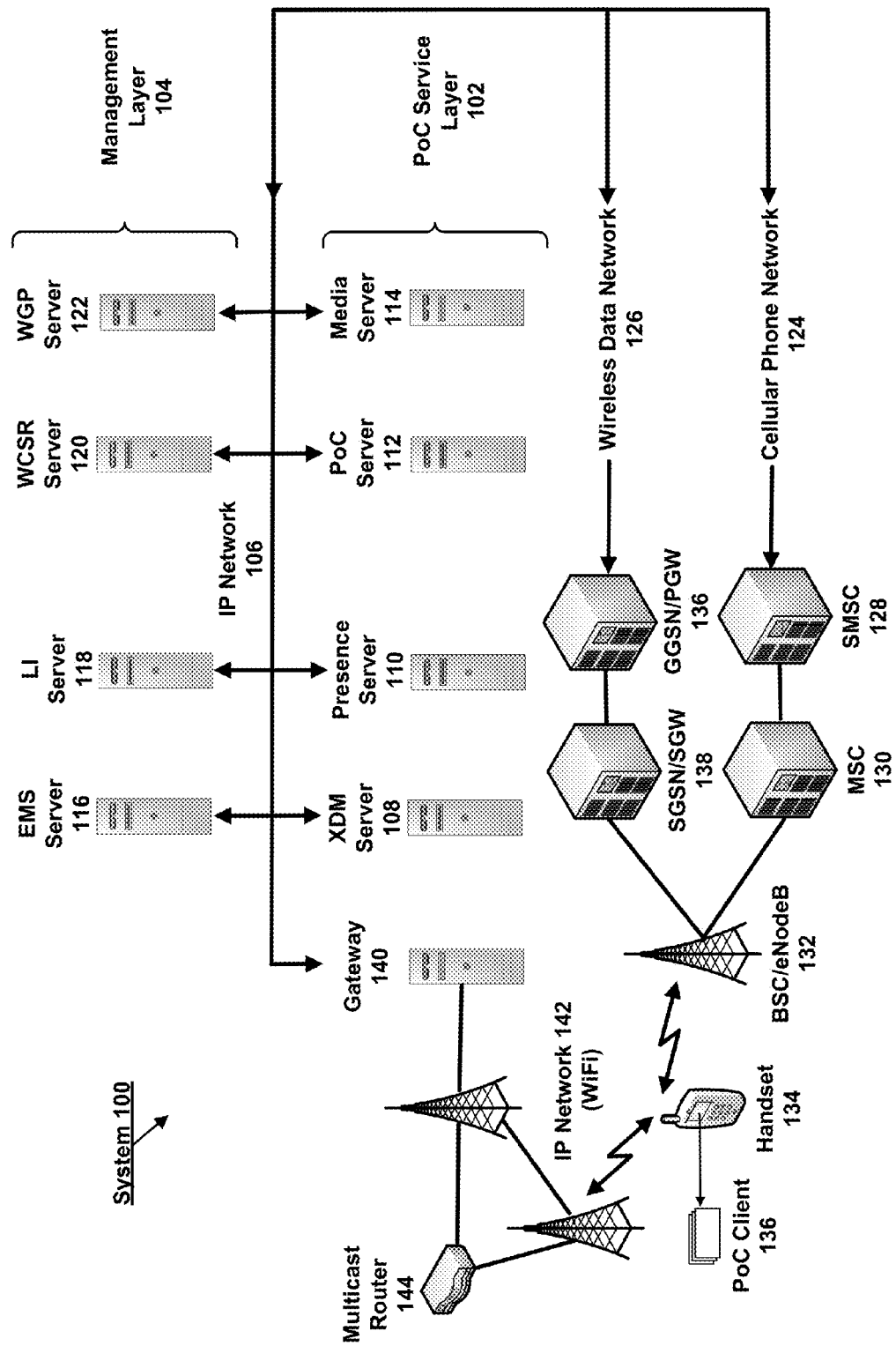
FIG. 1 illustrates the system architecture used in one embodiment of the present invention.

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

1 Overview

The present invention discloses a system for implementing advanced voice services in wireless communications networks that provides a feature-rich server architecture with a flexible client strategy. This system is an Open Mobile Alliance (OMA) standards-compliant solution that can be easily deployed, thereby enabling carriers to increase their profits, improve customer retention and attract new customers without costly upgrades to their network infrastructure. This system is built on a proven, reliable all-IP (Internet Protocol) platform. The highly scalable platform is designed to allow simple network planning and growth. Multiple servers can be distributed across operator networks for broad geographic coverage and scalability to serve a large and expanding subscriber base.

1.1 Definitions

The following table defines various acronyms, including industry-standard acronyms, that are used in this specification.

| Acronym | Description |
| --- | --- |
| ATCA | Advanced Telecommunications Computing Architecture |
| DnD | Do not Disturb |
| DNS | Domain Name Server |
| MBMS/eMBMS | Multimedia Broadcast Multicast Services |
| GPRS | General Packet Radio Service |
| GSM | Global System for Mobile communications |
| GTM | Global Traffic Manager |
| GTP | GPRS Tunneling Protocol |
| HTTP | Hypertext Transport Protocol |
| HTTPS | Secure Hypertext Transport Protocol |
| IMSI | International Mobile Subscriber Identity |
| IP | Internet Protocol |
| IPA | Instant Personal Alert |
| MBCP | Media Burst Control Protocol |
| MCC | Mobile Country Code |
| MDN | Mobile Directory Number |
| MNC | Mobile Network Code |
| MS-ISDN | Mobile Station International Subscriber Directory Number |
| OMA | Open Mobile Alliance |
| PoC | Push-to-talk-over-Cellular |
| PGW | Packet GateWay |

| Acronym | Description |
|---|---|
| PTT | Push-To-Talk |
| RTCP | Realtime Transport Control Protocol |
| RTP | Realtime Transport Protocol |
| SDP | Session Description Protocol |
| SIM | Subscriber Identity Module |
| SIP | Session Initiation Protocol |
| SMMP | Short Message peer-to-peer Protocol |
| SMS | Small Message Service |
| SRTP | Secure Real-time Transport Protocol |
| SSL | Secure Sockets Layer protocol |
| SSRC | Synchronization SouRCe |
| TLS | Transport Layer Security protocol |
| UDP | User Datagram Protocol |
| URI | Uniform Resource Identifier |
| VoIP | Voice-over-IP |
| VPN | Virtual Private Network |
| SGW | Serving GateWay |
| XCAP | XML Configuration Access Protocol |
| XDM | XML Document Management |
| XML | Extensible Mark-up Language |
| 4G/LTE | 4$^{th}$ Generation/Long Term Evolution |

The following table defines various terms, including industry-standard terms, that are used in this specification.

| Term | Description |
|---|---|
| 1-1 PoC Session | A feature enabling a PoC User to establish a PoC Session with another PoC User. |
| Ad Hoc PoC Group Session | A PoC Group Session established by a PoC User to PoC Users listed on the invitation. The list includes PoC Users or PoC Groups or both. |
| Answer Mode | A PoC Client mode of operation for the terminating PoC Session invitation handling. |
| Controlling PoC Function | A function implemented in a PoC Server, providing centralized PoC Session handling, which includes media distribution, Talk Burst Control, Media Burst Control, policy enforcement for participation in the PoC Group Sessions, and participant information. |
| Corporate | These subscribers will only receive contacts and groups from a corporate administrator. That means they cannot create their own contacts and groups from handset. |
| Corporate Public | These subscribers receive contacts and groups from a corporate administrator in addition to user-created contacts and groups. |
| Corporate Administrator | A user who manages corporate subscribers, their contacts and groups. |
| Firewall | A device that acts as a barrier to prevent unauthorized or unwanted communications between computer networks and external devices. |
| Home PoC Server | The PoC Server of the PoC Service Provider that provides PoC service to the PoC User. |
| Instant Personal Alert | A feature in which a PoC User sends a SIP based instant message to a PoC User requesting a 1-1 PoC Session. |
| Law Enforcement Agency | An organization authorized by a lawful authorization based on a national law to request interception measures and to receive the results of telecommunications interceptions. |
| Lawful Interception | The legal authorization, process, and associated technical capabilities and activities of Law Enforcement Agencies related to the timely interception of signaling and content of wire, oral, or electronic communications. |
| Notification | A message sent from the Presence Service to a subscribed watcher when there is a change in the Presence Information of some presentity of interest, as recorded in one or more Subscriptions. |
| Participating PoC Function | A function implemented in a PoC Server, which provides PoC Session handling, which includes policy enforcement for incoming PoC Sessions and relays Talk Burst Control and Media Burst Control messages between the PoC Client and the PoC Server performing the Controlling PoC Function. The Participating PoC Function may also relay RTP Media between the PoC Client and the PoC Server performing the Controlling PoC Function. |
| PoC Client | A functional entity that resides on the User Equipment that supports the PoC service. |
| Pre-Arranged PoC Group Identity | A SIP URI identifying a Pre-Arranged PoC Group. A Pre-Arranged PoC Group Identity is used by the PoC Client, e.g., to establish PoC Group Sessions to the Pre-Arranged PoC Groups. |
| Pre-Arranged PoC Group | A persistent PoC Group. The establishment of a PoC Session to a Pre-Arranged PoC Group results in the members being invited. |
| Pre-Established Session | The Pre-Established Session is a SIP Session established between the PoC Client and its Home PoC Server. The PoC Client establishes the Pre-Established Session prior to making requests for PoC Sessions to other PoC Users. To establish a PoC Session based on a SIP request from the PoC User, the PoC Server conferences other PoC Servers or users to the Pre-Established Session so as to create an end-to-end connection. |
| Presence Server | A logical entity that receives Presence Information from a multitude of Presence Sources pertaining to the Presentities it serves and makes this information available to Watchers according to the rules associated with those Presentities. |
| Presentity | A logical entity that has Presence Information associated with it. This Presence Information may be composed from a multitude of Presence |

| Term | Description |
|---|---|
| | Sources. A Presentity is most commonly a reference for a person, although it may represent a role such as "help desk" or a resource such as "conference room #27". The Presentity is identified by a SIP URI, and may additionally be identified by a tel URI or a pres URI. |
| Public | These subscribers create and manage their contacts and groups. |
| Serving Server | A set of primary and secondary servers. |
| Subscription | The information kept by the Presence Service about a subscribed watcher's request to be notified of changes in the Presence Information of one or more Presentities. |
| Watcher | Any uniquely identifiable entity that requests Presence Information about a Presentity from the Presence Service. |
| WiFi | A wireless local area network (WLAN). |

2 System Architecture

FIG. 1 illustrates the system architecture used in the present invention. This architecture conforms to the Advanced Telecommunications Computing Architecture (ATCA) standard to support the advanced voice services of the present invention. ATCA is an open standards-based, high-availability telecommunications platform architecture.

Preferably, the system 100 includes one or more PoC Service Layers 102 and one or more Management Layers 104, each of which is comprised of one or more servers interconnected by one or more IP networks 106. Specifically, the PoC Service Layer 102 includes one or more XML Document Management (XDM) Servers 108, Presence Servers 110, PoC Servers 112, and Media Servers 114, while the Management Layer 104 includes one or more Element Management System (EMS) Servers 116, Lawful Intercept (LI) Servers 118, Web Customer Service Representative (WCSR) Servers 120, and Web Group Provisioning (WGP) Servers 122. These various servers are described in more detail below.

The PoC Service Layer 102 and Management Layer 104 are connected to one or more wireless communications networks, such as cellular phone networks 124 and wireless data networks 126, as well as one or more IP networks 106. Note that the cellular phone networks 124 and wireless data networks 126 may be implemented in a single network or as separate networks. The cellular phone network 124 includes one or more Short Message Service Centers (SMSCs) 128, Mobile Switching Centers (MSCs) 130, and Base Station Components (BSCs) 132, wherein the BSCs 132 include controllers and transceivers that communicate with one or more customer handsets 134 executing a PoC Client 136. A handset 134 is also referred to as a mobile unit, mobile station, mobile phone, cellular phone, etc. and may comprise any wireless and/or wired device. The wireless data network 126, depending on its type, e.g., GPRS or 4G/LTE, includes one or more Gateway GPRS Support Nodes (GGSNs) or Packet Gateways (PGWs) 136 and Serving GPRS Support Nodes (SGSNs) or Serving GateWays (SGWs) 138, which also communicate with customer handsets 134 via BSCs or eNodeBs 132.

Finally, in one embodiment of the present invention, the PoC Service Layer 102 and Management Layer 104 are connected to one or more Gateways 140, which are coupled to one or more external IP networks 142, such as WiFi networks 142, possibly using one or more Multicast Routers 144, in order to communicate with one or more PoC Clients 136 on one or more handsets 134. Traffic to and from the wireless data networks 126 also traverses Gateways 140.

2.1 Cellular Phone Network

The PoC Service Layer 102 interacts with the SMSC 128 on the cellular phone network 124 to handle Short Message Service (SMS) operations, such as routing, forwarding and storing incoming text messages on their way to desired endpoints.

2.2 Wireless Data Network

The PoC Service Layer 102 also interacts with the following entities on the wireless data network 126:

The GGSN/PGW 136 transfers IP packets between the PoC Client 136 and the various servers:
  SIP/IP signaling messages between the PoC Server 112 and PoC Client 136 for control traffic exchange (i.e., control packets) for PoC call sessions.
  RTP/IP, RTCP/IP and MBCP/IP packets between the Media Server 114 and PoC Client 136 for bearer traffic exchange (i.e., voice packets) for PoC call sessions.
  SIP/IP signaling messages between the Presence Server 110 and PoC Client 136 for presence information.
  XCAP/HTTP/IP and SIP/IP signaling between the XDM Server 108 and PoC Client 136 for document management.

The SMSC 128 handles authentication:
  The XDM Server 108 communicates with the SMSC 128 via SMPP/IP for receiving the authentication code required for PoC Client 136 activation from the handset 134.

2.3 WiFi Network

The PoC Service Layer 102 also interacts with the following entities on the WiFi network 142:

The Gateway 140 transfers IP packets between the PoC Client 136 and the various servers:
  SIP/IP signaling messages between the PoC Server 112 and PoC Client 136 for control traffic exchange (i.e., control packets) for PoC call sessions.
  RTP/IP, RTCP/IP and MBCP/IP packets between the Media Server 114 and PoC Client 136 for bearer traffic exchange (i.e., voice packets) for PoC call sessions.
  SIP/IP signaling messages between the Presence Server 110 and PoC Client 136 for presence information.
  XCAP/HTTP/IP and SIP/IP signaling between the XDM Server 108 and PoC Client 136 for document management.
  SIP/IP signaling messages between the XDM Server 108 and PoC Client 136 for receiving the authentication code required for PoC Client 136 activation from the handset 134.

2.4 PoC Service Layer Elements

As noted above, the PoC Service Layer 102 is comprised of the following elements:
- PoC Server 112,
- Media Server 114,
- Presence Server 110,
- XDM Server 108, and
- Gateway 140.

These elements are described in more detail below.

2.4.1 PoC Server

The PoC Server 112 handles the PoC call session management and is the core for managing the PoC services for the PoC Clients 136 using SIP protocol. The PoC Server 112 implements a Control Plane portion of Controlling and Participating PoC Functions. A Controlling PoC Function acts as an arbitrator for a PoC Session and controls the sending of control and bearer traffic by the PoC Clients 136. A Participating PoC Function relays control and bearer traffic between the PoC Client 136 and the PoC Server 112 performing the Controlling PoC Function.

2.4.2 Media Server

The Media Server 114 implements a User Plane portion of the Controlling and Participating PoC Functions. The Media Server 114 supports the Controlling PoC Function by duplicating voice packets received from an originator PoC Client 136 to all recipients of the PoC Session. The Media Server 114 also supports the Participating PoC Function by relaying the voice packets between PoC Clients 136 and the Media Server 114 supporting the Controlling PoC Function. The Media Server 114 also handles packets sent to and received from the PoC Clients 136 for floor control during PoC call sessions.

2.4.3 Presence Server

The Presence Server 110 implements a presence enabler for the PoC Service. The Presence Server 110 accepts, stores and distributes Presence Information for Presentities, such as PoC Clients 136.

The Presence Server 110 also implements a Resource List Server (RLS), which accepts and manages subscriptions to Presence Lists. Presence Lists enable a "watcher" application to subscribe to the Presence Information of multiple Presentities using a single subscription transaction.

The Presence Server 110 uses certain XDM functions to provide these functions, which are provided by XDM Server 108.

2.4.4 XDM Server

The XDM Server 108 implements an XDM enabler for the PoC Service. The XDM enabler defines a common mechanism that makes user-specific service-related information accessible to the functions that need them. Such information is stored in the XDM Server 108 where it can be located, accessed and manipulated (e.g., created, changed, deleted, etc.). The XDM Server 108 uses well-structured XML documents and HTTP protocol for access and manipulation of such XML documents. The XDM Server 108 also connects to the operator SMSC 128 for the purposes of PoC Client 136 activation using SMS. In addition, the XDM Server 108 maintains the configuration information for all PoC subscribers.

2.4.5 Gateway

The Gateway 140 implements a interworking solution for the PoC Service to communicate via one or more IP network 142 access points to the PoC Clients 136. Specifically, the Gateway 140 provides PoC Service over an IP network 142 (such as an external WiFi network), as well as the wireless data networks 126, and supports a seamless user experience while the transport of IP control messages and IP voice data is transitioned between different types of wireless communications networks, such as wireless data networks 126 comprising cellular data packet networks and IP networks 142. The Gateway 140 also resolves security concerns that arise with such interworking solutions.

This is necessary because the quality, performance and availability of the wireless data networks 126 typically vary from location to location based on various factors. In addressing these issues, the interworking solution implemented by the Gateway 140 provides following benefits:

- PoC Services becomes available even in those locations where a wireless data network 126 is not available, but where a general purpose IP network 142 is available. This is particularly more useful in enhancing in-building coverage for the PoC Service.
- By connecting over the IP network 142, the available IP bandwidth, quality and performance can be more streamlined and controlled since the IP network 142 (typically) has a greater capacity and throughput as compared to the wireless data network 126, which is more shared in nature.
- By utilizing the greater available bandwidth over the IP network 142, as compared to the wireless data network 126, it is possible to provide additional services (such as sharing large files) which otherwise is inefficient and costly on wireless data networks 126.

These and other aspects of the interworking solution are described in more detail below.

2.5 Management Layer Elements

As noted above, the Management Layer 104 is comprised of the following elements:
- Element Management System (EMS) Server 116,
- Lawful Intercept (LI) Server 118,
- Web Group Provisioning (WGP) Server 122, and
- Web Customer Service Representative (WCSR) Server 120.

These elements are described in more detail below.

2.5.1 EMS Server

The EMS Server 116 is an operations, administration, and maintenance platform for the system 100. The EMS Server 116 enables system administrators to perform system-related configuration, network monitoring and network performance data collection functions. The EMS Server 116, or another dedicated server, may also provide billing functions. All functions of the EMS Server 116 are accessible through a web-based interface.

2.5.2 LI Server

The LI Server 118 is used for tracking services required by various Lawful Enforcement Agents (LEAs). The LI Server 118 generates and pushes an IRI (Intercept Related Information) Report for all PoC Services used by a target. The target can be added or deleted in to the PoC Server 112 via the LI Server 118 using a Command Line Interface (CLI).

2.5.3 WGP Server

The WGP Server 122 provides a web interface for corporate administrators to manage PoC contacts and groups. The web interface includes contact and group management operations, such as create, delete and update contacts and groups.

2.5.4 WCSR Server

The WCSR Server 120 provides access to customer service representatives (CSRs) for managing end user provisioning and account maintenance.

Typically, it supports the following operations:
- Create Subscriber account,
- Update Subscriber account, Delete Subscriber account,
Mobile number change command,
View Subscriber details (MDN, Group, Group members),
Manage Corporate Accounts,
Add CSR account,
Delete CSR account.

3 System Functions

The following sections describe various functions performed by each of the components of the system architecture.

3.1 PoC Service Layer 3.1.1 PoC Server

The PoC Server 112 controls PoC call sessions, including 1-1, Ad Hoc and Pre-Arranged PoC call sessions. The PoC Server 112 also controls Instant Personal Alerts.

The PoC Server 112 expects the PoC Clients 136 to setup "pre-established sessions" at the time of start up and use these sessions to make outgoing PoC calls. The PoC Server 112 also uses pre-established sessions to terminate incoming PoC calls to the PoC Clients 136. The PoC Clients 136 are setup in auto-answer mode by default. The use of pre-established sessions and auto-answer mode together allow for faster call setup for PoC call sessions.

The PoC Server 112 allocates and manages the media ports of the Media Services 114 associated with each SIP INVITE dialog for pre-established sessions and controls the Media Servers 114 to dynamically associate these ports at run time for sending RTP packets during PoC call sessions. Media ports are assigned and tracked by the PoC Server 112 at the time of setting up pre-established sessions. The PoC Server 112 instructs the Media Server 114 to associate the media ports of various subscribers dynamically into a session when a PoC call is originated and this session is maintained for the duration of the call. The PoC Server 112 also controls the floor states of the various participants in a PoC call session by receiving indications from the Media Servers 114 and sending appropriate requests back to the Media Servers 114 to send MBCP messages to the participants in the PoC call. The Media Server 114 uses the media ports association and current talker information to send the RTP packets from the talker's media port onto the listeners' media ports.

In addition, the PoC Server 112 handles the incoming and outgoing Instant Personal Alerts (IPAs) by routing SIP MESSAGE requests to the PoC Clients 136 and remote PoC Servers 112 for final delivery as applicable.

The PoC Server 112 uses static and dynamic data related to each subscriber to perform these functions. Static data include subscriber profile, contacts and groups. Dynamic data include the subscriber's registration state, PoC settings and SIP dialog states are maintained only on the PoC Server 112.

3.1.2 Media Server

The Media Server 114 handles the flow of data to and from the PoC Clients 136 as instructed by the PoC Server 112. Each Media Server 114 is controlled by a single PoC Server 112, although multiple Media Servers 114 may be controlled by a PoC Server 112 simultaneously.

The Media Server 114 is completely controlled by the PoC Server 112. As noted above, even the media ports of the Media Server 114 are allocated by the PoC Server 112 and then communicated to the Media Server 114. Likewise, floor control requests received by the Media Server 114 from PoC Clients 136 are sent to the PoC Server 112, and the PoC Server 112 instructs the Media Server 114 appropriately.

Based on these instructions, the Media Server 114 sends floor control messages to the PoC Clients 136 and sends the RTP packets received from the talker to all the listeners.

3.1.3 Presence Server

The Presence Server 110 accepts presence information published by PoC Clients 136, as well as availability information received from other entities. The Presence Server 110 keeps track of these presence states and sends notifications to various "watcher" applications whenever a presence state changes. The Presence Server 110 maintains separate subscriptions for each watcher and dynamically applies the presence authorization rules for each watcher independently.

The Presence Server 110 also accepts resource list subscriptions from the watchers, which identify one or more entities ("Presentities") whose presence should be monitored. The Presence Server 110 then aggregates all the presence information into one or more presence notifications transmitted to each watcher. This allows watchers to subscribe to large number of Presentities without putting strain on the network as well as client and server resources.

3.1.4 XDM Server

The XDM Server 108 performs client authentication and subscription functions. The XDM Server 108 also stores subscriber and group information data. The XDM Server 108 also interacts with the SMSC 128 to receive PoC Client 136 activation commands.

All subscriber provisioning and CSR operations in the XDM Server 108 are performed through the WCSR Server 120, while corporate administrative operations, as well as contacts and group management, are handled through the WGP Server 122.

The XDM Server 108 includes a Subscriber Profile Manager module that provides subscriber management functionality, such as creation, deletion and modification of subscriber profiles. The subscriber profile includes data such as the MDN, subscriber name, subscriber type, etc. This also determines other system-wide configurations applicable for the subscriber including the maximum number of contacts and groups per subscriber and the maximum number of members per group.

The XDM Server 108 includes a Subscriber Data Manager module that manages the subscriber document operations, such as contact and group management operations, initiated by the PoC Clients 136 or the WGP Server 122.

3.1.5 Gateway

The Gateway 140 performs interworking for the PoC service by communicating with the PoC Clients 136 via one or more IP networks 142 and/or wireless data networks 126.

The PoC Client 136 sets up one or more connections using the configured Fully Qualified Domain Name (FQDN), or absolute domain name, of the Gateway 140, which may be publicly exposed to the Internet 142. Secure transport protocols may (or may not) be used for the connections across the IP networks 142 and/or wireless data networks 126. For example, the PoC Clients 136 may use the Transport Layer Security (TLS) and/or Secure Sockets Layer (SSL) protocols for encrypting information transmitted over the connections between the PoC Client 136 and the Gateway 140.

In such an embodiment, all SIP signaling and voice data (RTP and RTCP) would be tunneled over the SSL/TLS connections between the PoC Client 136 and the Gateway 140. XCAP signaling may be transmitted using a Hypertext Transfer Protocol Secure (HTTPS) protocol, which results from layering the Hypertext Transfer Protocol (HTTP) on top of the SSL/TLS connections, thus adding the security capabilities of SSL/TLS to standard HTTP communications.

Consequently, the Gateway 140 performs as an encryption/decryption off-loader that provides end-to-end encryption for all traffic transmitted to and from the PoC Client 136. Specifically, all of the traffic sent to the PoC Client 136 is encrypted at the Gateway 140 and all the traffic received from the PoC Client 136 is decrypted at the Gateway 140.

The Gateway 140 terminates the SSL/TLS connections and aggregates or dis-aggregates the PoC Client 136 traffic to the appropriate Servers 108, 110, 112, 114, 116, 118, 120 and 122. Specifically, the Gateway 140 acts as an intelligent traffic distributor for SIP signaling and RTP/RTCP traffic by forwarding the traffic to the appropriate Servers 108, 110, 112, 114, 116, 118, 120 and 122, depending on the message types and the availability of the Servers 108, 110, 112, 114, 116, 118, 120 and 122. Consequently, the Gateway 140 is a single point-of-contact for all traffic to and from the PoC Clients 136 at an IP transport layer via the IP networks 142 and/or wireless data networks 126.

Typically, the SSL/TLS connections are persisted and used for any bidirectional data transfer between the Gateway 140, or other Servers, and the PoC Clients 136. Thus, a PoC Client 136 maintains an "always-on" connection with the Gateway 140 by periodically sending "keep-alive" messages over the SSL/TLS connections.

The system also simplifies the use of the Multicast Routers 144.

3.2 Management Layer 3.2.1 EMS Server

The EMS Server 116 is the central management entity in the system and includes the following modules:

A central application where all management business logic resides.

A web server for serving the network operator's internal users. A corresponding client provides a user interface for viewing fault, configuration, performance and security information.

A subsystem is provided for health monitoring of network elements deployed in the system and also to issue any maintenance commands as applicable.

3.2.2 WCSR Server

The WCSR Server 120 provides a web user interface for customer service representatives (CSRs) to carry out various operations. The web user interface provides access to CSRs for managing subscriber provisioning and account maintenance. Typically, it supports the following operations.

Create Subscriber account,
Update Subscriber account,
Delete Subscriber account,
Mobile number change command,
Forced synchronization of a Subscriber,
Deactivate a Subscriber account,
Reactivate a Subscriber account,
View Subscriber details, such as MDN, Group, Group members.

3.2.3 WGP Server

The WGP Server 122 allows provides for central management of all corporate subscribers and associated contacts and groups within a corporation. The WGP Server 122 allows corporate administrators to manage contacts and groups for corporate subscribers.

The WGP Server 122 includes a Corporate Administration Tool (CAT) that is used by corporate administrators to manage contacts and groups of corporate subscribers. The CAT has a Web User Interface for corporate administrators that supports the following operations:

Group management,
Contact management, and
Associations between corporations.

With regard to group management, the CAT of the WGP Server 122 includes the following operations:

Create, Update, Delete and View Corporate Groups,
Add, Update, Delete and View Members of a Corporate Group,
Manage Subscribers,
Activate and Deactivate a Corporate Subscriber,
Change a Subscriber type from "Corporate" to "Corporate And Public", and vice versa,
Restrict Availability, i.e., do not allow subscriber to change their presence status, and
Manage number porting or name change via phone assignment.

With regard to contact management, the CAT of the WGP Server 122 includes the following operations:

Phone list management,
N×N Contact Add (e.g., N contacts may be members of N groups),
Add, Update, Delete and View Contacts for a specific subscriber, and
Export and Import contacts at both the subscriber and corporate level.

With regard to associations between corporations, the CAT of the WGP Server 122 includes the following operations:

Corporate Associations Attributes,
Association Name,
Association ID,
Association Mode (e.g., One-way, Two-way), and
Restricted List.

Once the association is created and accepted, corporate administrators can create contacts and groups using the association policies. Administrators from other corporations can view the contacts, and may or may not have the capability to add, update or delete the contacts.

Corporate ID associated per corporate subscriber,
Central management of corporate subscribers, groups, and contacts,
Intercorporate associations, including contacts and whitelists,
Phone list management (e.g., N×N contact add),
Restrict Availability, and
Import and Export contacts at both the subscriber and corporate level.

Note that, if the association is deleted, then usually all intercorporate contacts and group members will be deleted.

3.3 PoC Client

The PoC Client 136 is an OMA-compatible client application executed on a handset 134. The following features are supported by the PoC Client 136:

PoC Calls and Instant Personal Alert,
Presence, and
Contact and Group Management.

The PoC Client 136 includes a database module, a presence module, an XDM module and a client module.

The database module stores configuration information, presence information, contact and group information, user settings, and other information in an optimized and persistent way. Information is preserved when the user unregisters with the PoC Server 112 or power cycles the device. The database module also has a mechanism to reset the data and synchronize from the XDM Server 108 when the data in the database module is corrupt or unreadable.

The presence module creates and maintains the presence information for the subscriber. Typically, the presence information supports Available, Unavailable and Do-not-Disturb (DnD) states. The presence module also subscribes to the Presence Server 110 as a "watcher" of all contacts in the handset 134 and updates the user interface of the handset 134 whenever it receives a notification with such presence information.

The XDM module communicates with the XDM Server 108 for management of contacts and groups. The XDM module may subscribe with the XDM Server 108 to send and receive any changes to the contacts or group list, and updates the user interface of the handset 134 based on the notifications it receives from the XDM Server 108.

The client module provides the most important function of making and receiving PoC calls. To support PoC calls, the client module creates and maintains pre-established sessions with the PoC Server 112. The client module supports 1-1, Ad Hoc and Pre-Arranged PoC calls. The client module also supports sending and receiving Instant Personal Alerts (IPA).

4 State Diagram for a Poc Call Session

Figure 2:
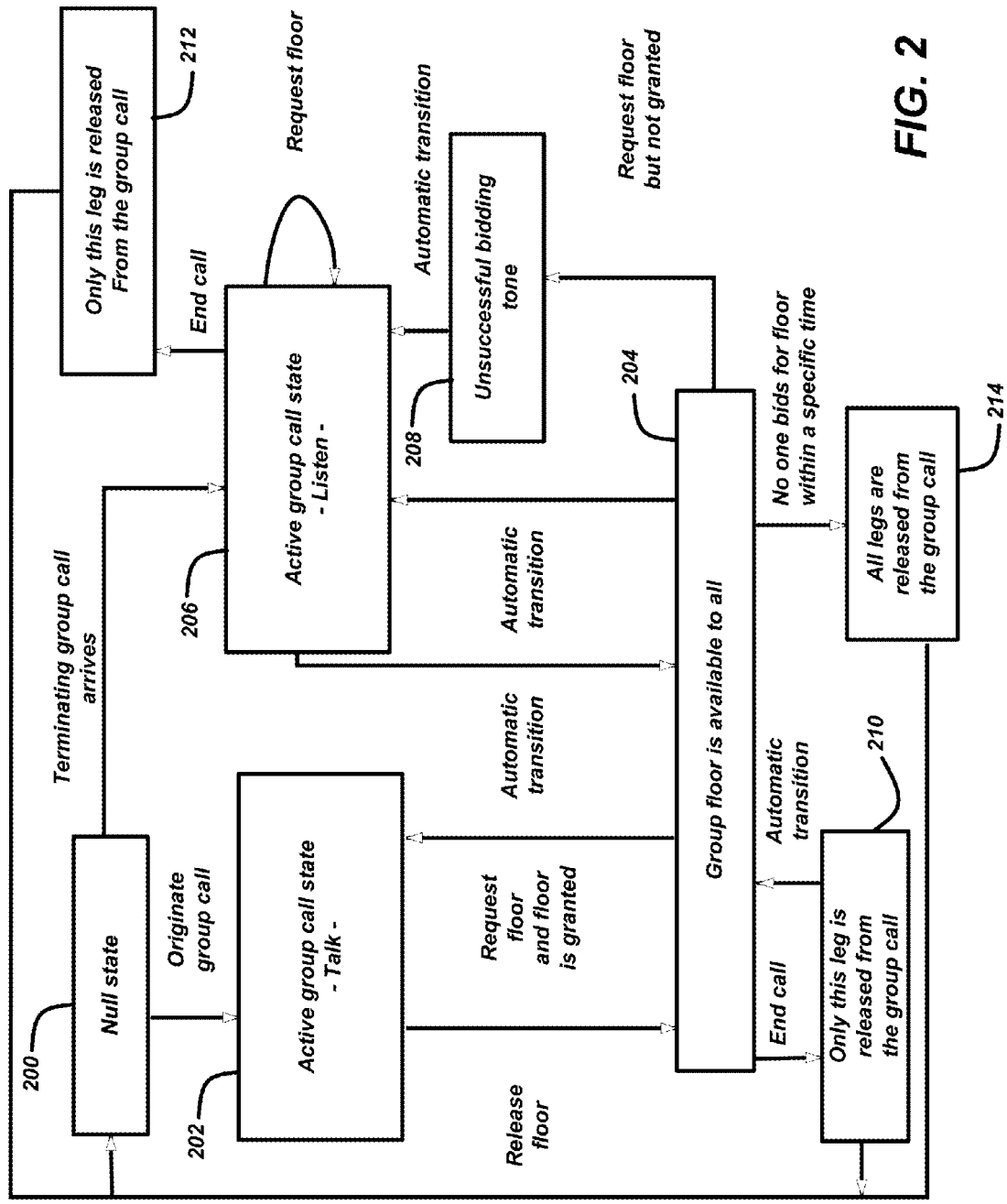
FIG. 2 is a state diagram that illustrates the operation of a PoC session according to one embodiment of the present invention.

FIG. 2 is a state diagram that illustrates the operation of a PoC call session according to one embodiment of the present invention.

State 200 represents a PoC Client 136 in a NULL state, i.e., the start of the logic. A transition out of this state is triggered by a user making a request to originate a PoC call, or by a request being made to terminate a PoC call at the handset 134. A request to originate a PoC call is normally made by pressing a PoC button, but may be initiated in this embodiment by dialing some sequence of one or more numbers on the handset 134 that are interpreted by the PoC Server 112, by pressing one or more other keys on the handset 134 that are interpreted by the PoC Server 112, by speaking one or more commands that are interpreted by the PoC Server 112, or by some other means.

State 202 represents the PoC Client 136 in an active group call state, having received a "floor grant" (permit to speak). In this state, the user receives a chirp tone that indicates that the user may start talking. The user responds by talking on the handset 134. The handset 134 uses the reverse traffic channel to send voice frames to the Media Server 114, and the Media Server 114 switches voice frames only in one direction, i.e., from talker to one or more listeners, which ensures the half-duplex operation required for a PoC call.

State 204 represents the group "floor" being available to all members of the group. When the talking user signals that the floor is released, the floor is available to all group members. The signal to release the floor is normally made by releasing the PoC button, but may be performed in this embodiment by voice activity detection, e.g., by not speaking for some time period (which is interpreted by the PoC Server 112 as a release command). All members of the group receive a "free floor" tone on their handset 134. A user who requests the floor first (in the "free-floor" state), for example, is granted the floor, wherein the system 100 sends a chirp tone to the successful user. The signal to request the floor is normally made by pressing the PoC button, but may be performed in this embodiment by voice activity detection, e.g., by speaking for some time period (which is interpreted by the PoC Server 112 as a request command).

State 206 represents the PoC Client 136 being in an active group call state. In this state, the user is listening to the group call. If a non-talking user requests the floor in the active group call state, the user does not receive any response from the system 100 and remains in the same functional state. As noted above, the signal to request the floor is normally made by pressing the PoC button, but may be performed in this embodiment by voice activity detection, e.g., by speaking for some time period (which is interpreted by the PoC Server 112 as a request command).

State 208 represents a user receiving an "unsuccessful bidding" tone on his handset 134, after the user has requested the floor, but was not granted the floor, of the group call. The user subsequently listens to the voice message of the talking user.

Non-talking users (including the talking user who must release the floor to make it available for others) can request the system 100 to end their respective call legs explicitly.

State 210 represents a terminating leg being released from the call after the user ends the call.

State 212 also represents a terminating leg being released from the call after the user ends the call.

State 214 represents all terminating legs being released from the call when no user makes a request for the within a specified time period, or after all users have ended their respective call legs.

5 Poc Service in Hetnets and Multimode Small Cell Environments 5.1 Overview

The present invention provides a multi-connectivity approach for PoC services. As PoC services continue to be deployed in the midst of the carrier deployments of heterogeneous networks (HetNets) and multimode small cell environments, this invention can take advantage of these networks to improve user experience with PoC services.

This invention describes a mechanism to allow PoC services to be improved by using multiple simultaneous connections in HetNets and multimode small cell environments. Specifically, this invention proposes a scheme where PoC control messages or signaling and PoC data or voice frames are transported simultaneously across multiple connections to multiple networks.

This invention increases the continuity of PoC services as a user transitions across these networks. Specifically, multiple simultaneous connections across HetNets and multimode small cell environments allow for improved reliability, smoother transitions and increased bandwidth or throughput.

Figure 3:
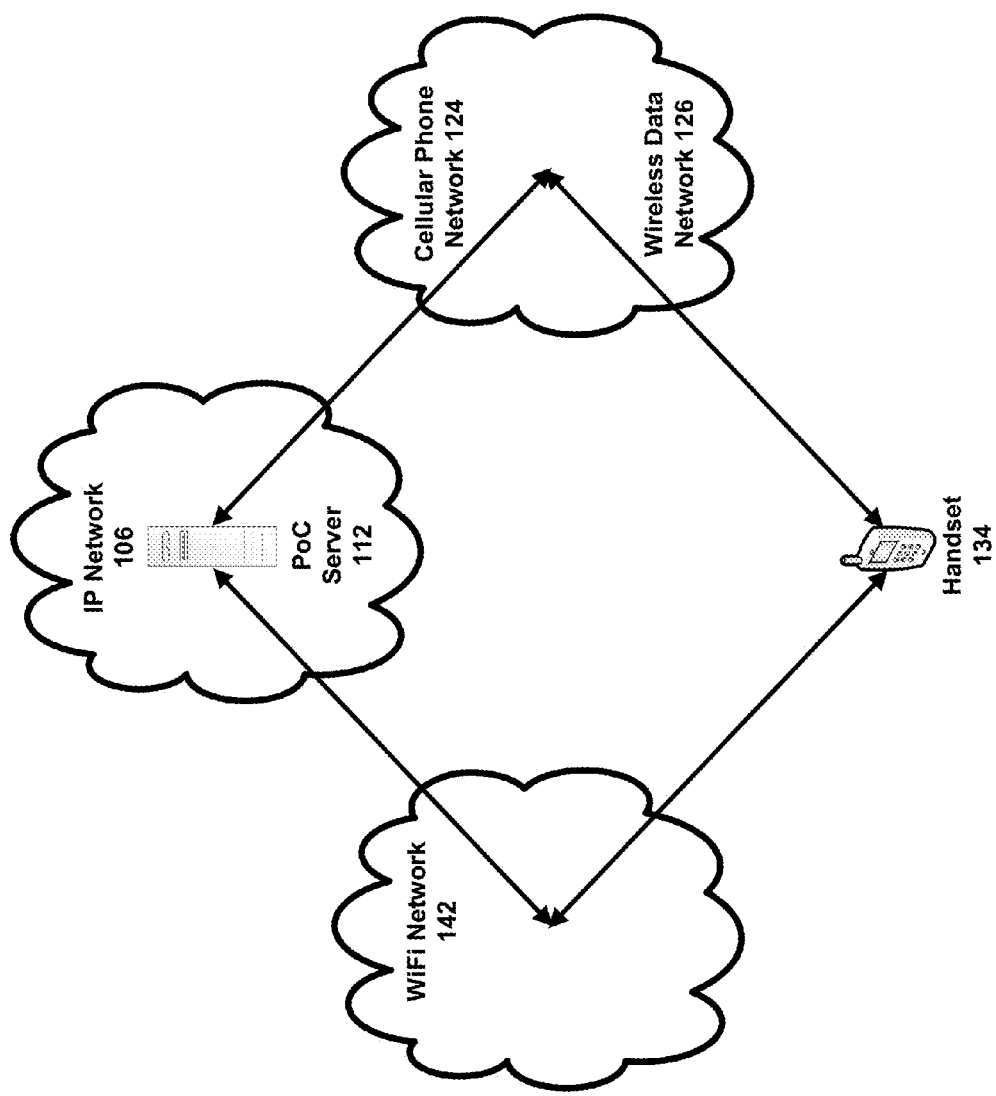
FIG. 3 illustrates the operation of multiple simultaneous connections via different access networks according to one embodiment of the present invention.

FIG. 3 shows a scenario where the handset 134 maintains multiple simultaneous connections via different access networks, including the cellular phone network 124 and/or the wireless data network 126, as well as the WiFi network 142. Other networks may be used as well.

In this invention, data transmission between the handset 134 and the PoC Server 112 occurs simultaneously over multiple networks 124, 126, 142. Specifically, downlink data from the PoC Server 112 (or other servers) is sent simultaneously over the multiple connections to the handset 134. Similarly, uplink data from the handset 134 is sent simultaneously over the multiple connections to the PoC Server 112 (or other servers).

In this invention, data is duplicated for the simultaneous data transmission over the multiple networks 124, 126, 142, in order to increase reliability and throughput. Specifically, downlink data from the PoC Server 112 is duplicated (i.e., the same stream of data) and sent simultaneously over the multiple connections to the handset 134. Similarly, uplink data from the handset 134 is duplicated (i.e., the same stream of data) and sent simultaneously over the multiple connections to the PoC Server 112.

There may also be seamless transitions across the multiple networks 124, 126, 142 while the simultaneous data transmission is occurring. For example, based on specified criteria, the handset 134 may release one or more of the multiple connections, but transitions across the multiple networks 124, 126, 142, are typically achieved by breaking an old connection after making a new connection, in order to ensure continuity.

Using multiple simultaneous connections, this invention can increase the reliability and throughput to the handsets 134. By duplicating the same data stream simultaneously to multiple networks 124, 126, 142, it is possible for the handset 134 and PoC Server 112 to achieve seamless transitions across the networks 124, 126, 142. By distributing the same data streams to multiple networks 124, 126, 142, it is also possible to achieve higher throughput across the networks 124, 126, 142.

5.2 Network Selection Optimization

In addition to the general case described above, there are additional deployment considerations for this invention. Specifically, this invention also proposes various optimization methods to utilize the best possible network with the best use of available resources (such as radio resources, battery, etc.).

Thus, this invention also provides a method to select one or more primary (preferred) networks 124, 126, 142 and one or more secondary (backup) networks 124, 126, 142. Note that selection of a primary or secondary network 124, 126, 142 may also be performed dynamically by the PoC Client 136 and/or the PoC Server 112 based on the information reported by or to the PoC Client 136 or the PoC Server 112.

Network selection logic may include a number of different criteria known as decision factors, such as network latency (i.e., round trip time), packet loss, signal strength, and/or transport cost (i.e., cost of data transmission).

Figure 4:
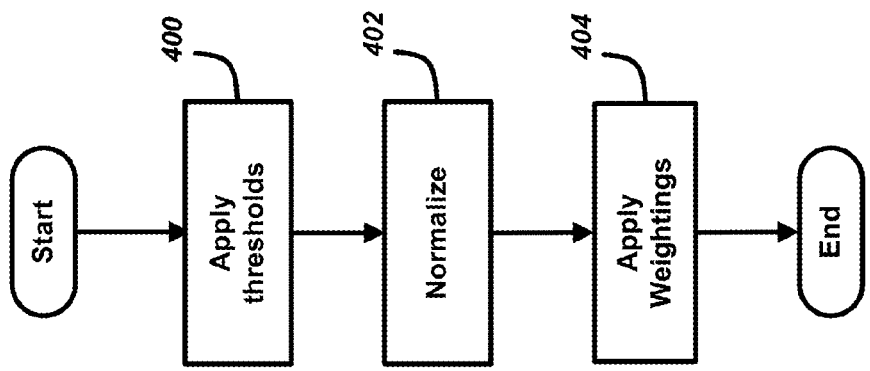
FIG. 4 is a flowchart that illustrates the network selection logic according to one embodiment of the present invention.

Generally, this logic is shown in the flowchart of FIG. 4 and includes the following steps:

Step 400: Apply thresholds for selecting decision factors. For example, a factor may be ignored if its value is above a minimum "good" threshold for the network under consideration. In another example, a factor may be ignored if the quantum of difference between the values of two factors is below a minimum threshold, i.e., the difference is negligible.

Step 402: Normalization of values. The values observed for each of the decision factors is normalized to have a consistent numeric representation across all decision factors.

Step 404: Network selection is performed based on weightings applied to the decision factors. For example, the following logic may be used:

If $(\Sigma(Fi(N1)-Fi(N2))*Wi)>0$, then select network N1; else select network N2

In the above logic, Fi represents an ith decision factor, Ni represents a network, and Wi represents the weighting for the ith decision factor. Of course, other logic may be used as well.

5.3 Error Correction Information

Heuristic determination of the error correction level may also be performed, and that information may also be used as a decision factor. When there are multiple networks 124, 126, 142 available, voice data may be transmitted in the primary network 124, 126, 142 based on various decision factors described above. The secondary networks 124, 126, 142 that are not actively used for transmitting voice data may be used for transmitting other information, such as the error correction level information, wherein the error correction level information relates to the primary network 124, 126, 142.

The error correction level may be determined heuristically by the PoC Client 136 based on packet loss and voice quality reports for that location made during previous call sessions and reported to the PoC Server 112. The location of the PoC Client 136 is usually identified as a combination of cell location and WiFi location, e.g., MCC+MNC+LAC+Cell Id+WiFi SSId.

5.4 Session Establishment

Figure 5:
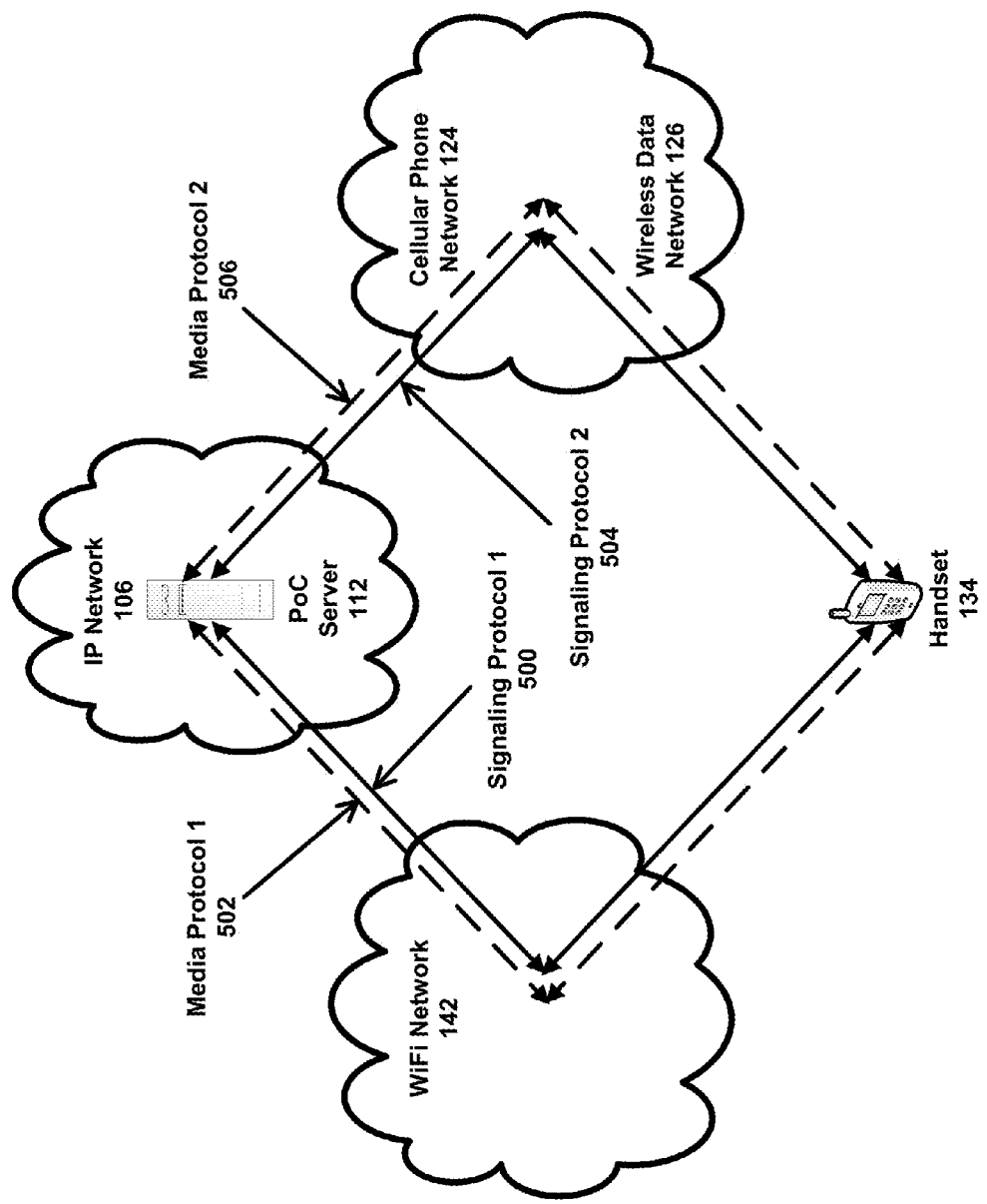
FIG. 5 illustrates the operation of multiple simultaneous connections via different access networks using different signaling and media protocols according to one embodiment of the present invention.

FIG. 5 illustrates the operation of multiple simultaneous connections via different access networks using different signaling and media protocols, according to one embodiment of the present invention. As shown in this diagram, the selection of protocols 500, 502, 504, 506 to exchange signaling and media information between the handset 134 and PoC Server 112 may be based on characteristics of underlying networks 124, 126, 142, wherein the signaling protocols 500, 504 are shown in solid lines and the media protocols 502, 506 are shown in dashed lines.

For example, while on a 4G/LTE network 126, the PoC Client 136 of the handset 134 may utilize SIP over TLS as a signaling protocol 500 and Media over SRTP/SRTCP as a media protocol 502, while on a WiFi network 142, the PoC Client 136 may utilize SIP over WebSocket as a signaling protocol 504 and Media over WebRTC as a media protocol 596 (which uses various enterprise firewall tunneling techniques to transport SRTP/SRTCP media information).

Also note that, with regard to the session establishment or PoC call setup, the selection of primary and secondary networks 124, 126, 142 can be pre-established or made on-demand. For example, for normal priority PoC calls, the PoC Client 136 may use a pre-established PoC session over a primary network 124, 126, 142. The PoC Client 136 may also establish, in parallel, an on-demand session over a secondary network 124, 126, 142 to provide multi-path redundancy. If a pre-established PoC session does not exist, then on-demand PoC sessions may be attempted simultaneously on both the primary and secondary networks 124, 126, 142.

In another example, for high priority PoC calls, the PoC Client 136 may use multiple pre-established PoC sessions over multiple networks 124, 126, 142 simultaneously. The PoC Client 136 may also establish, in parallel, one or more on-demand sessions over secondary networks 124, 126, 142 to provide additional redundancy.

Either or both the PoC Server 112 and the handset 134 may be responsible for end-to-end connectivity. Loss of a primary network 124, 126, 142 connection for any reason may make the handset 134 and/or PoC Server 112 unreachable on that network 124, 126, 142. However, one or more of the secondary networks 124, 126, 142 may act as a fallback mechanism to notify the handset 134 and/or PoC Server 112 to reconnect.

Figure 6:
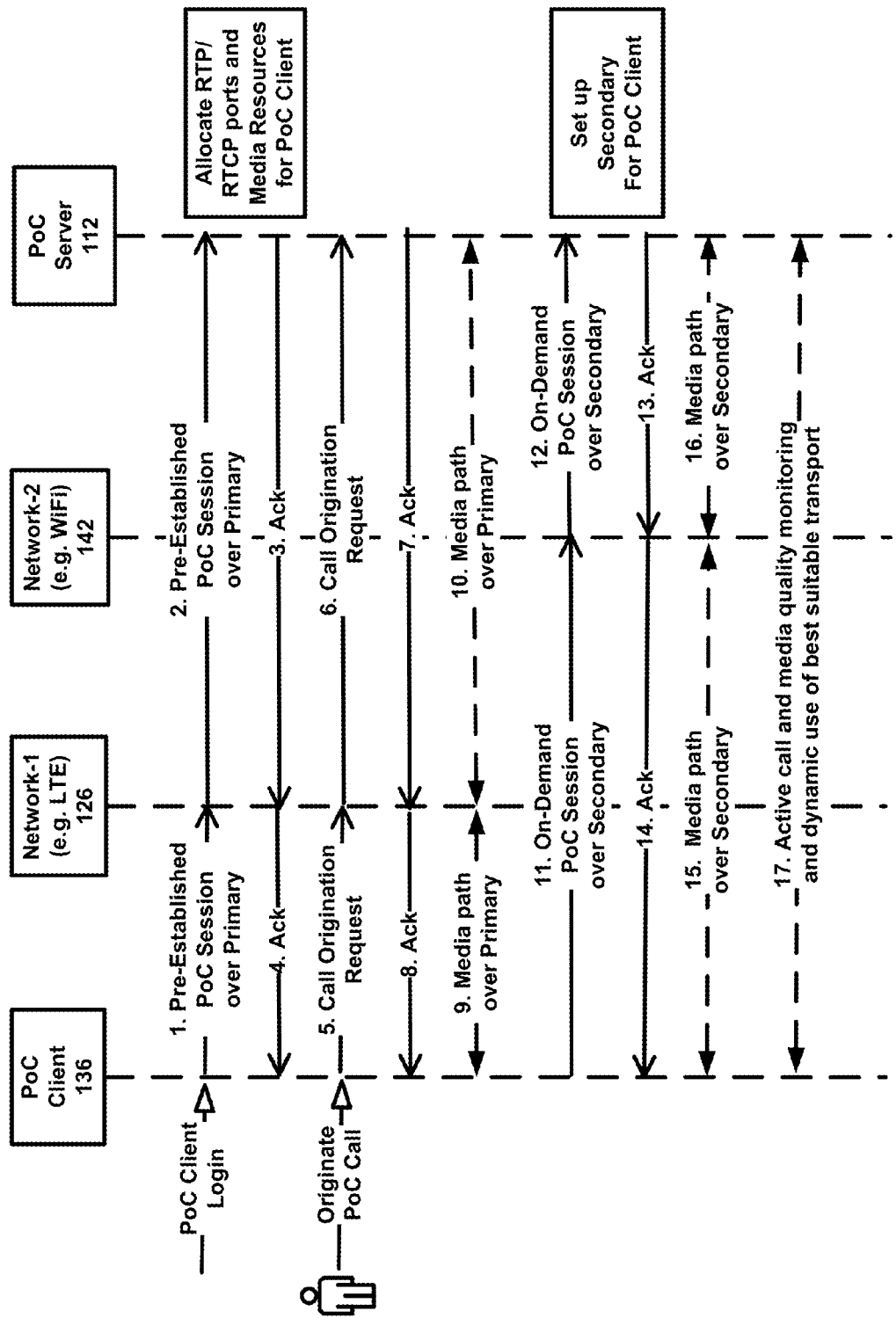
FIG. 6 is a call flow that illustrates session establishment and management according to one embodiment of the present invention.

FIG. 6 is a call flow diagram that shows the details of session management and call transitions, according to one embodiment of the present invention, wherein the signaling protocols are shown in solid lines and the media protocols are shown in dashed lines.

When a PoC Client 136 of a handset 134 initiates a login, a PoC pre-established session is set up over the primary network, which in this example comprises a 4G/LTE network 126, and the PoC Server 112 allocates RTP and RTCP ports and media resources for the PoC Client 136 on the primary network 126 (in steps 1, 2, 3, 4).

When the PoC Client 136 originates a PoC Call, a PoC Call Origination Request is transmitted to the PoC Server 112 over the primary network 126, which the PoC Server 112 acknowledges (in steps 5, 6, 7, 8).

A media path is then established between the PoC Server 112 and the PoC Client 136 over the primary network 126 (in steps 9, 10).

A PoC on-demand session is set up over the secondary network, which in this example comprises a WiFi network 142, and the PoC Server 112 allocates RTP and RTCP ports and media resources for the PoC Client 136 on the secondary network 142 (in steps 11, 12, 13, 14).

A media path is then established between the PoC Server 112 and the PoC Client 136 over the secondary network 142 (in steps 15, 16).

Thereafter, the PoC call session proceeds, with both the PoC Client 136 and PoC Server 112 performing active call and media quality monitoring during the PoC call session, along with dynamic use of the best suitable transport, i.e., either the primary network 126 or secondary network 142 (in step 17).

5.5 Heterogeneous Packetization

When the PoC Client 136 of a handset 134 is connected to the PoC Server 112 through multiple networks 124, 126, 142, the optimal packetization logic on each network 124, 126, 142 may result in different numbers of voice frames being transmitted per packet on each network 124, 126, 142. In order to handle the different packetization logic, an adaptive jitter buffer in the PoC Client 136 and/or the PoC Server 112 may be used to homogenize voice messages being transmitted on each network 124, 126, 142.

For example, a PoC Client 136 may transmit three voice frames per packet on the primary network 124, 126, 142, and seven voice frames per packet on the secondary network 124, 126, 142. The adaptive jitter buffer in the PoC Server 112 merges the packets received on both these streams and emits a resulting output. A similar adaptive jitter buffer in the PoC Client 136 may perform the same function.

Specifically, the adaptive jitter buffer logic may remove duplicate voice frames received through the plurality of wireless communications networks. The adaptive jitter buffer logic may also reorder voice frames received through the plurality of wireless communications networks. In addition, the adaptive jitter buffer logic may handle packets containing a variable number of voice frames on each of the plurality of wireless communications networks.

6 Conclusion

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A system for providing communications services in a plurality of wireless communications networks, comprising:
one or more servers that interface to the plurality of wireless communications networks to perform communications for one or more mobile units, wherein the communications services include an instant two-way half-duplex voice call within a group of the one or more mobile units comprising a Push-to-Talk-over-Cellular (PoC) call session;
wherein both the one or more servers and the one or more mobile units communicate with each other using control messages transmitted over the plurality of wireless communications networks, and at least one of the one or more servers switches voice frames for the communications services between the one or more mobile units across the plurality of wireless communications networks;
wherein at least one of the one or more servers manages the PoC call session by acting as an arbitrator for the PoC call session and controls sending of the control messages and the voice frames to and from the one or more mobile units;
wherein at least one of the one or more mobile units and at least one of the one or more servers use multiple simultaneous connections to the plurality of wireless communications networks to communicate with each other; and
wherein the multiple simultaneous connections comprise:
a first connection between a first mobile unit of the one or more mobile units and a first server of the one or more servers over a first network of the plurality of wireless communications networks; and
a second connection between the first mobile unit and the first server over a second network of the plurality of wireless communications networks, wherein the first connection and the second connection are maintained simultaneously, and wherein the first network is separate from the second network.

2. The system of claim 1, wherein the control messages and the voice frames are transported simultaneously across each of the plurality of wireless communications networks.

3. The system of claim 1, wherein the control messages and the voice frames are duplicated to provide duplicated control messages and duplicated voice frames, wherein the control messages and the voice frames are transmitted over the first connection to the first mobile unit simultaneously while the duplicated control messages and the duplicated voice frames are transmitted over the second connection to the first mobile unit.

4. The system of claim 1, wherein the one or more mobile units transition between the multiple simultaneous connections to the plurality of wireless communications networks.

5. The system of claim 1, wherein the first network is selected as a primary network and the second network is selected as a secondary network.

6. The system of claim 5, wherein selection of the primary network and the secondary network is performed dynamically by at least one of the one or more mobile units or the one or more servers based on information reported by or to the one or more mobile units or the one or more servers.

7. The system of claim 6, wherein the primary network and the secondary network are selected in accordance with decision factors, wherein the decision factors comprise network latency, packet loss, signal strength transport cost, or a combination thereof.

8. The system of claim 7, wherein the selection of the primary network and the secondary network comprises applying thresholds to the decision factors, normalizing values observed for the decision factors, and applying weightings to the decision factors.

9. The system of claim 5, wherein the PoC call session includes a pre-established PoC call session over the primary network.

10. The system of claim 9, wherein the PoC call session includes an on-demand PoC call session established simultaneously over the secondary network.

11. The system of claim 1, wherein an error correction level is determined heuristically by at least one of the mobile units or servers based on reports for a specified location made during previous PoC call sessions.

12. The system of claim 1, wherein an adaptive jitter buffer is used to homogenize the voice frames transmitted simultaneously over the first connection and the second connection.

13. The system of claim 12, wherein the adaptive jitter buffer removes duplicate voice frames received over the first connection and the second connection.

14. The system of claim 12, wherein the adaptive jitter buffer reorders voice frames received over the first connection and the second connection.

15. The system of claim 12, wherein the first network is a different type of network than the second network, wherein first packets transmitted in the first network comprise a different number of voice frames than second packets transmitted in the second network, and wherein the adaptive jitter buffer homogenizes the first packets and the second packets containing the different number of voice frames received over the first connection and the second connection.

16. A method of providing communications services in a plurality of wireless communications networks, comprising:
   interfacing one or more servers to the plurality of wireless communications networks to perform communications services for one or more mobile units, wherein the communications services include an instant two-way half-duplex voice call within a group of the one or more mobile units comprising a Push-to-Talk-over-Cellular (PoC) call session;
   wherein both the one or more servers and the one or more mobile units communicate with each other using control messages transmitted over the plurality of wireless communications networks, and at least one of the one or more servers switches voice frames for the communications services between the one or more mobile units across the plurality of wireless communications networks;
   wherein at least one of the one or more servers manages the PoC call session by acting as an arbitrator for the PoC call session and controls sending of the control messages and the voice frames to and from the one or more mobile units; and
   wherein at least one of the one or more mobile units and at least one of the one or more servers use multiple simultaneous connections to the plurality of wireless communications networks to communicate with each other; and wherein the multiple simultaneous connections comprise:
     a first connection between a first mobile unit of the one or more mobile units and a first server of the one or more servers over a first network of the plurality of wireless communications networks; and
     a second connection between the first mobile unit and the first server over a second network of the plurality of wireless communications networks, wherein the first connection and the second connection are maintained simultaneously, and wherein the first network is a different type of network than the second network.

17. The method of claim 16, wherein the control messages and voice frames are transported simultaneously across each of the plurality of wireless communications networks.

18. The method of claim 16, wherein the control messages and the voice frames are duplicated to provide duplicated control messages and duplicated voice frames, wherein the control messages and the voice frames are transmitted over the first connection simultaneously while the duplicated control messages and the duplicated voice frames are transmitted over the second connection.

19. The method of claim 16, wherein the one or more mobile units transition between the multiple simultaneous connections to the plurality of wireless communications networks.

20. The method of claim 16, wherein the first network is selected as a primary network and the second network is selected as a secondary network.

21. The method of claim 20, wherein selection of the primary network and the secondary network is performed dynamically by at least one of the one or more mobile units or the one or more servers based on information reported by or to the one or more mobile units or the one or more servers.

22. The method of claim 21, wherein the primary network and the secondary network are selected in accordance with decision factors, wherein the decision factors comprise network latency, packet loss, signal strength, transport cost, or a combination thereof.

23. The method of claim 22, wherein the selection of the primary network and the secondary network comprises applying thresholds to the decision factors, normalizing values observed for the decision factors, and applying weightings to the decision factors.

24. The method of claim 20, wherein the PoC call session includes a preestablished PoC call session over the primary network.

25. The method of claim 24, wherein the PoC call session includes an on-demand PoC call session established simultaneously over the secondary network.

26. The method of claim 16, wherein an error correction level is determined heuristically by at least one of the one or more mobile units or the one or more servers based on reports for a specified location made during previous PoC call sessions.

27. The method of claim 16, an adaptive jitter buffer is used to homogenize the voice frames transmitted simultaneously over the first connection and the second connection.

28. The method of claim 27, wherein the adaptive jitter buffer removes duplicate voice frames received over the first connection and the second connection.

29. The method of claim 27, wherein the adaptive jitter buffer reorders voice frames received over the first connection and the second connection.

30. The method of claim 27, wherein first packets transmitted in the first network comprise a different number of voice frames than second packets transmitted in the second network, and wherein the adaptive jitter buffer homogenizes the first packets and the second packets containing the different number of voice frames received over the first connection and the second connection.

* * * * *